US011988041B2

(12) United States Patent
Liang et al.

(10) Patent No.: US 11,988,041 B2
(45) Date of Patent: May 21, 2024

(54) SCROLLING SYSTEM FOR WINDOW CURTAIN

(71) Applicants: Wen Ying Liang, Changhua County (TW); Jian Zhi Huang, Changhua County (TW)

(72) Inventors: Wen Ying Liang, Changhua County (TW); Jian Zhi Huang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 85 days.

(21) Appl. No.: 17/225,921

(22) Filed: Apr. 8, 2021

(65) Prior Publication Data

US 2022/0186558 A1 Jun. 16, 2022

(30) Foreign Application Priority Data

Dec. 14, 2020 (TW) ................................ 109216493

(51) Int. Cl.
*E06B 9/76* (2006.01)
*E06B 9/42* (2006.01)

(52) U.S. Cl.
CPC . *E06B 9/76* (2013.01); *E06B 9/42* (2013.01)

(58) Field of Classification Search
CPC .... E06B 9/322; E06B 2009/3222; E06B 9/76; E06B 9/78; E06B 9/307; E06B 2009/285; E06B 9/42
See application file for complete search history.

(56) References Cited

U.S. PATENT DOCUMENTS 4,503,899 A * 3/1985 Forquer .................... E06B 9/76 160/133
4,676,292 A * 6/1987 Valle ....................... E06B 9/307 160/176.1 R
5,396,945 A * 3/1995 Meyer ...................... E06B 9/322 160/177 R
5,553,649 A * 9/1996 Chisaka .................... E06B 9/76 160/176.1 R
5,791,393 A * 8/1998 Judkins ..................... E06B 9/60 160/84.05
6,786,270 B2 * 9/2004 Wen ........................ E06B 9/322 192/92
8,851,148 B2 * 10/2014 Lin .......................... E06B 9/40 160/174 R
9,376,859 B1 * 6/2016 DeWard .................. E06B 9/323
(Continued)

*Primary Examiner* — Daniel P Cahn
*Assistant Examiner* — Matthew R. Shepherd
(74) *Attorney, Agent, or Firm* — Che-Yang Chen; Law office of Michael Chen

(57) ABSTRACT

A scrolling system for a window curtain includes a transmission device connected between a shaft to which the curtain is wrapped, and a fixed frame fixed. The transmission device includes a housing in which a first transmission unit and a second transmission unit are accommodated. The first transmission unit includes a first bevel gear which is engaged with a second bevel gear of the second transmission unit. The shaft is connected to the second transmission unit. The first transmission unit includes a loop which is located beyond the housing. A driving rod is hooked to the loop and drives the first bevel gear which drives the second bevel gear so that the second transmission unit is rotated, such that the shaft is rotated to operate the curtain up and down.

6 Claims, 7 Drawing Sheets

(56) References Cited

U.S. PATENT DOCUMENTS

| | | | | |
|---|---|---|---|---|
| 10,053,909 | B2 * | 8/2018 | Wang | E06B 9/44 |
| 10,975,618 | B2 * | 4/2021 | Lin | E06B 9/307 |
| 2007/0089840 | A1 * | 4/2007 | Huang | E06B 9/307<br>160/177 R |
| 2008/0023157 | A1 * | 1/2008 | Ganzi | E06B 9/323<br>160/176.1 R |
| 2010/0270457 | A1 * | 10/2010 | Ko | E06B 9/322<br>248/674 |
| 2011/0203742 | A1 * | 8/2011 | Lin | E06B 9/262<br>160/238 |
| 2011/0259533 | A1 * | 10/2011 | Lin | E06B 9/76<br>160/340 |
| 2013/0220044 | A1 * | 8/2013 | Wen | F16H 35/10<br>74/411 |
| 2013/0340951 | A1 * | 12/2013 | Yu | E06B 9/322<br>160/405 |
| 2015/0225997 | A1 * | 8/2015 | Soper | E06B 9/40<br>160/309 |
| 2019/0284872 | A1 * | 9/2019 | Huang | E06B 9/307 |
| 2019/0323288 | A1 * | 10/2019 | Chen | E06B 9/322 |
| 2020/0080372 | A1 * | 3/2020 | Hsu | E06B 9/50 |

* cited by examiner

SCROLLING SYSTEM FOR WINDOW CURTAIN

BACKGROUND OF THE INVENTION

1. Fields of the Invention

The present invention relates to a scrolling system for a window curtain without control ropes.

2. Descriptions of Related Art

The conventional way to control movement of a window curtain is to pull a control rope or a bead chain which is exposed outside the curtain. The exposed control rope or bead chain has potential risk for children. Some of the manufacturers design a fabric sleeve to receive the control rope or bead chain, and this method increases the cost of the window curtain. The fabric sleeve may not be suitable for specific interior design.

The present invention intends to provide a scrolling system for a window curtain without control ropes so as to eliminate shortcomings mentioned above.

SUMMARY OF THE INVENTION

The present invention relates to a scrolling system for a window curtain, and comprises a frame and a shaft. A curtain is scrolled to the shaft. A transmission device is connected between the shaft and the frame so as to rotate the shaft and to scroll the curtain. The transmission device includes a housing in which a first transmission unit and a second transmission unit are accommodated. The housing is located between the frame and the shaft, and includes a first space and a second space. The first space is defined in the lower portion of the housing, so that the first transmission unit is accommodated in the first space. The second space is defined axially in the housing, so that the second transmission unit is accommodated in the second space. The first transmission unit includes a first bevel gear, a first portion and a second portion. The first portion is formed between the first bevel gear and the second portion. The first bevel gear and the first portion are located in the first space, wherein the second portion extends beyond the first space. A driving rod is connected to the second portion so that the second portion is rotated by the driving rod. The second transmission unit includes the second bevel gear and a tubular part. The second bevel gear is connected to the tubular part and engaged with the first bevel gear, wherein the axis of the first gear is perpendicular to the axis of the second bevel gear. The tubular part is connected to the shaft. When the driving rod is rotated, the first bevel gear drives the second bevel gear which rotates the tubular part, such that the shaft is rotated to operate the curtain.

Preferably, the frame includes a recess. The housing includes a protrusion which is engaged with the recess.

Preferably, the housing is composed of two casings. The first and second transmission units are accommodated in the housing.

Preferably, the tubular part includes multiple ridges protruding from the outside thereof. The ridges are engaged with the shaft.

Preferably, the second portion includes a loop. The driving rod includes a hook which hooks to the loop.

Preferably, the first portion includes a cylindrical section and a polygonal section. A polygonal passage is formed to the inner periphery of the first space. When the cylindrical section is located relative to the polygonal passage, the first transmission unit is rotatable. When the polygonal section is located relative to the polygonal passage, the first transmission unit is not rotatable.

Preferably, the second bevel gear includes a reception hole defined axially in the back thereof. The tubular part includes a polygonal-shaped tube which is engaged with the reception hole to connect the second bevel gear to the tubular part.

The advantages of the present invention are that the control ropes or bead chains are replaced by the driving rod to enhance the safety issues related the use of the control ropes or bead chains.

The window curtains without the control ropes or bead chains meet the needs of interior design because the control ropes or bead chains do not need to be hidden or covered by using a sleeve.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
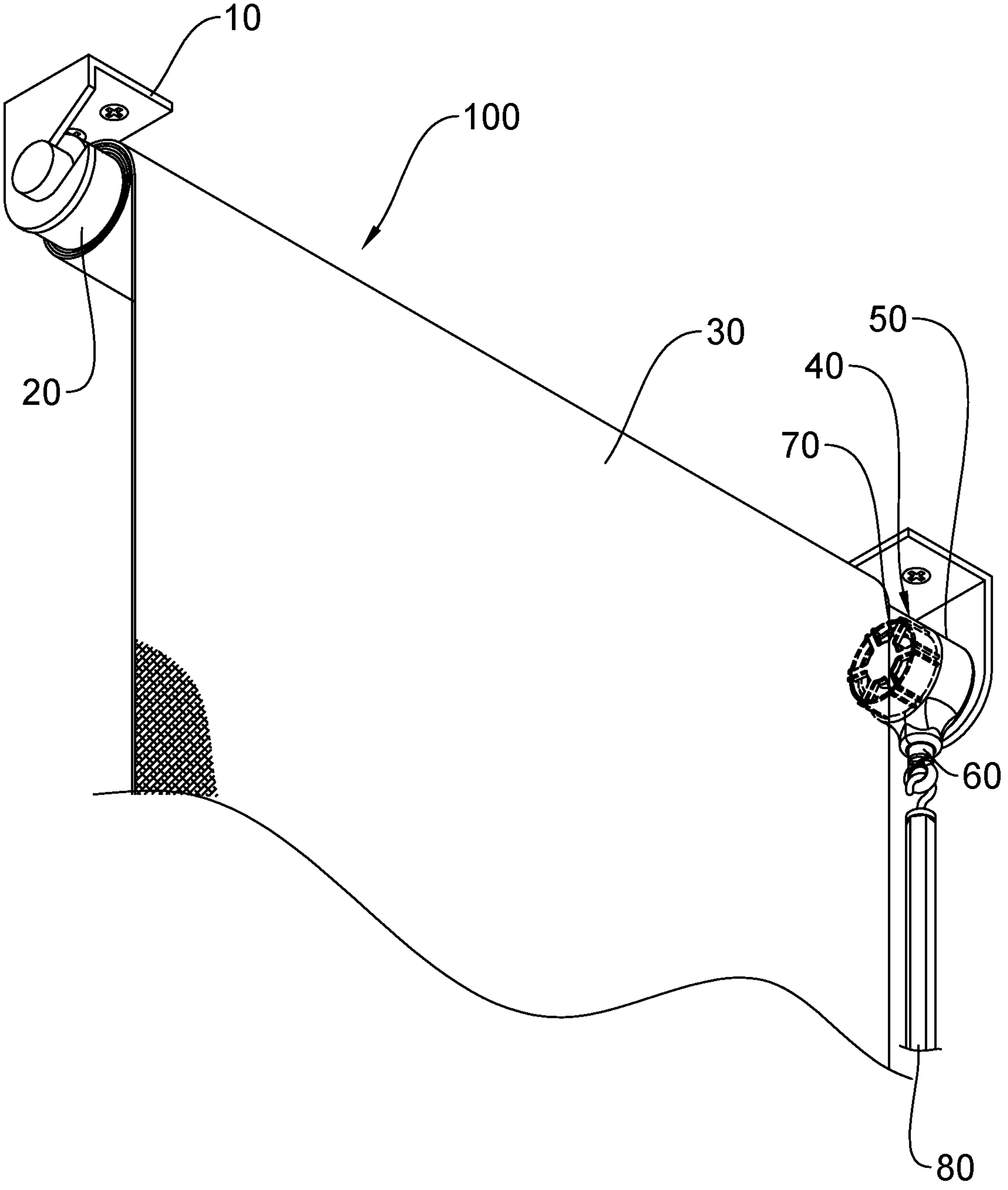
FIG. 1 is a perspective view to show the scrolling system of the present invention is used to a window curtain.
Figure 2:
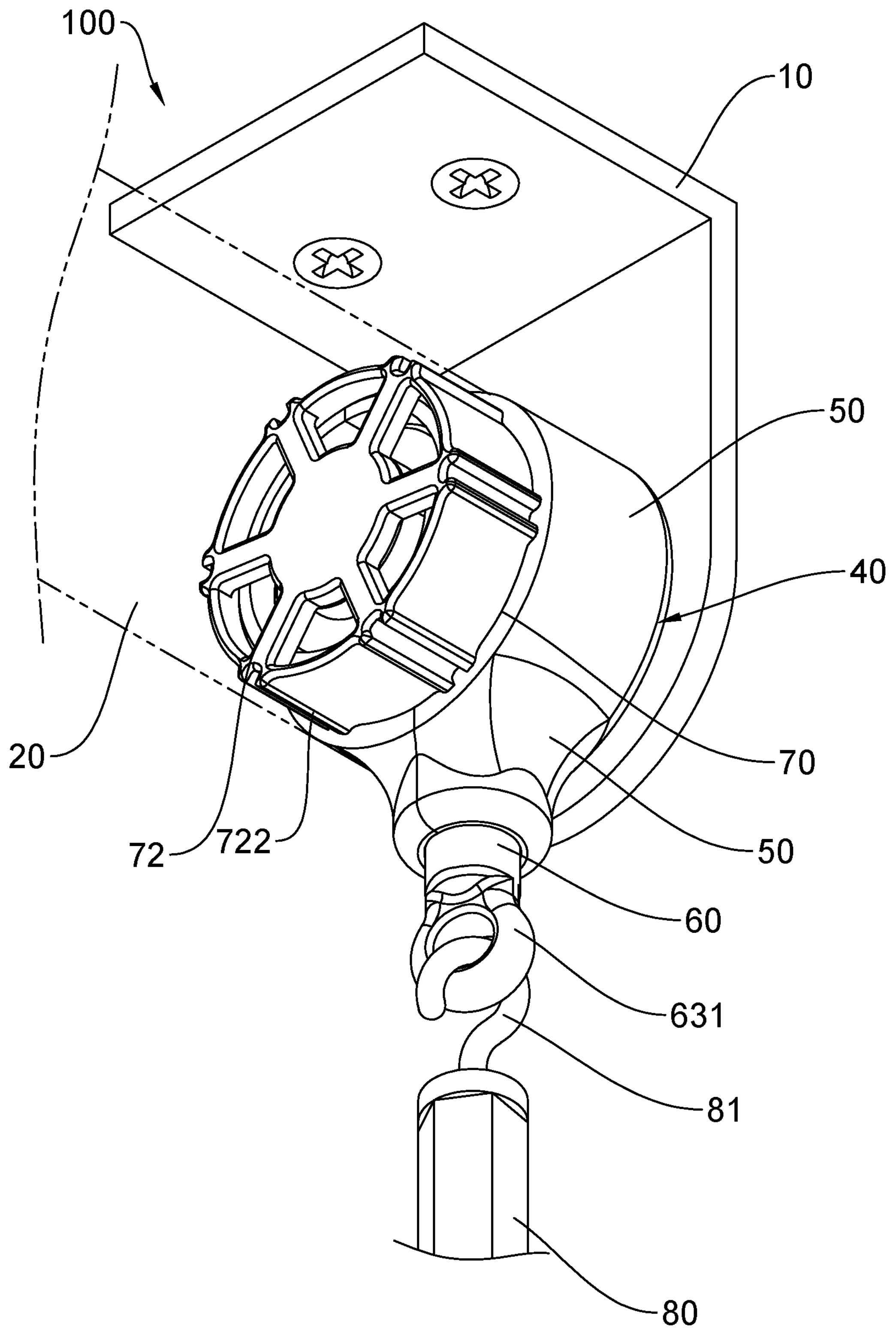
FIG. 2 is an enlarged perspective view to show the scrolling system of the present invention.

Referring to FIGS. 1 to 7, the scrolling system for a window curtain of the present invention comprises a scrolling device 100 which includes a frame 10 and a shaft 20, and a curtain 30 is scrolled to the shaft 20. A transmission device 40 is connected between the shaft 20 and the frame 10 so as to rotate the shaft 20 and to scroll the curtain 30. The transmission device 40 includes a housing 50, a first transmission unit 60 and a second transmission unit 70.

The housing 50 located between the shaft frame 10 and the shaft 20. The housing 50 is a hollow housing and composed of two casings 51. The first and second transmission units 60, 70 are accommodated in the housing 50. The housing 50 includes a first space 52 and a second space 53, wherein the first space 52 defined in the lower portion of the housing 50, and the second space 53 is defined axially in the housing 50. The first transmission unit 60 is accommodated in the first space 52, and the second transmission unit 70 is accommodated in the second space 53. The frame 10 includes a recess 11, and the housing 50 includes a protrusion 511 which is engaged with the recess 11, so that the transmission device 40 is connected to the frame 10 stably.

Figure 3:
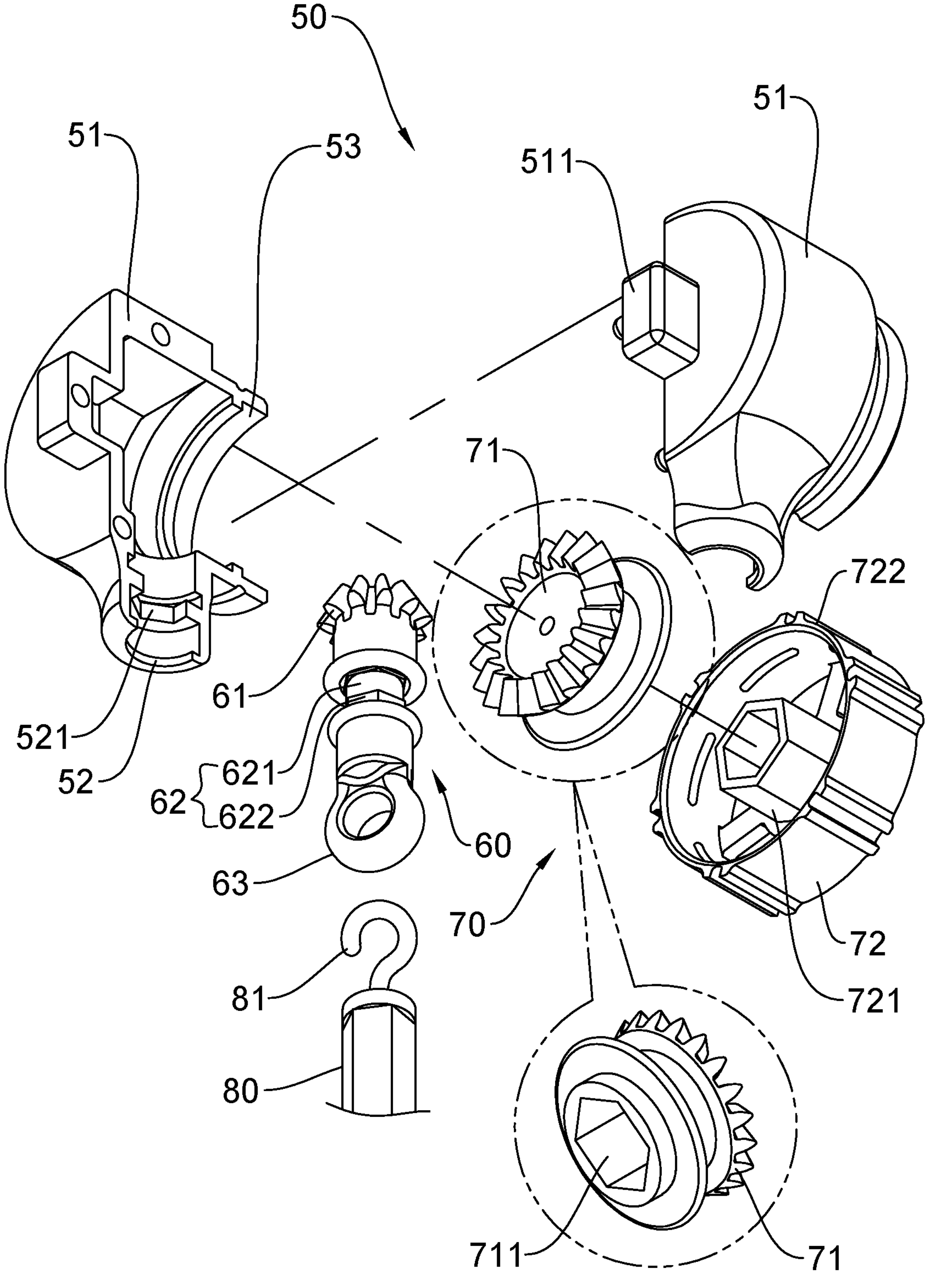
FIG. 3 is an exploded view of the scrolling system of the present invention.
Figure 4:
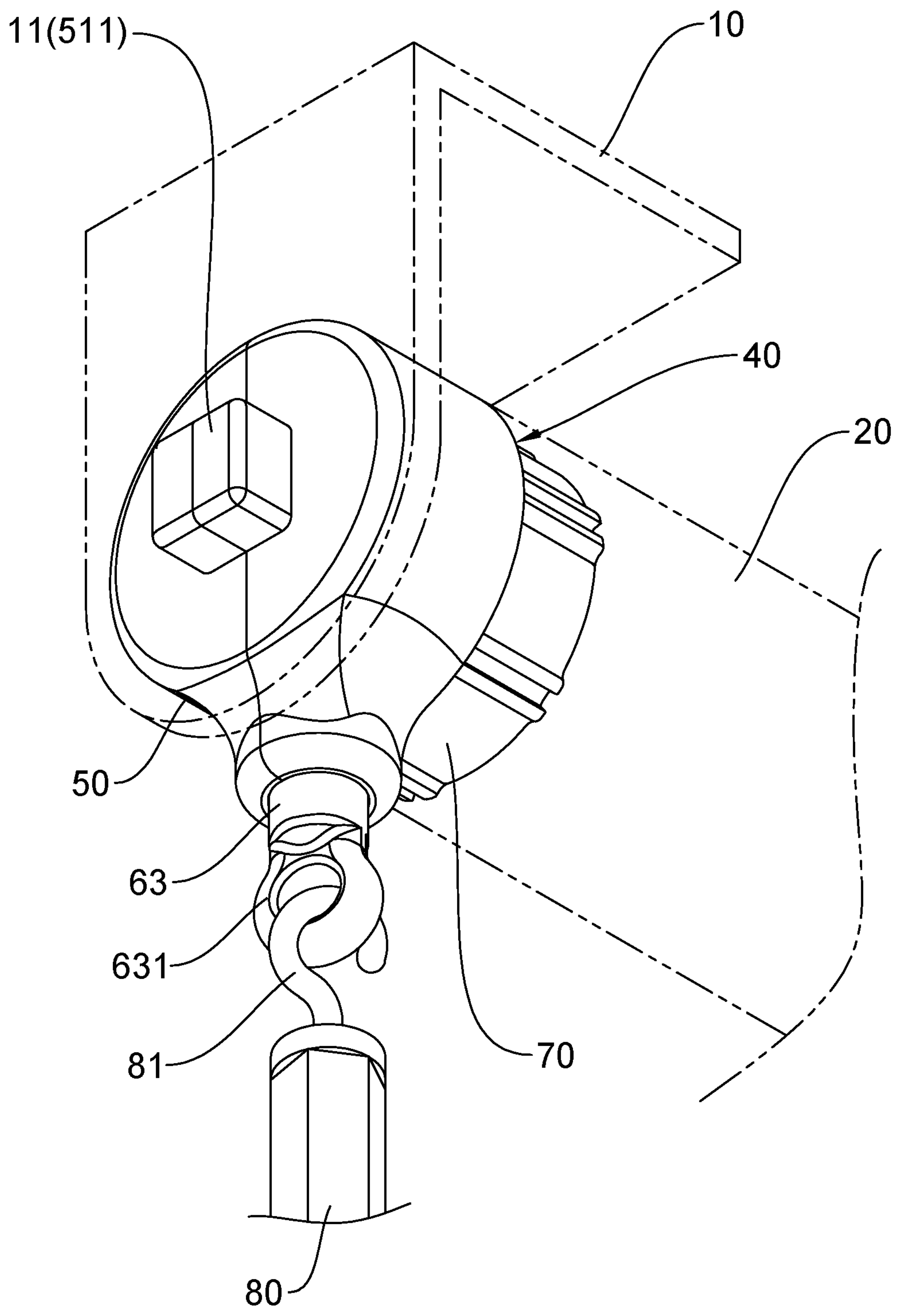
FIG. 4 is another enlarged perspective view to show the scrolling system of the present invention.
Figure 5:
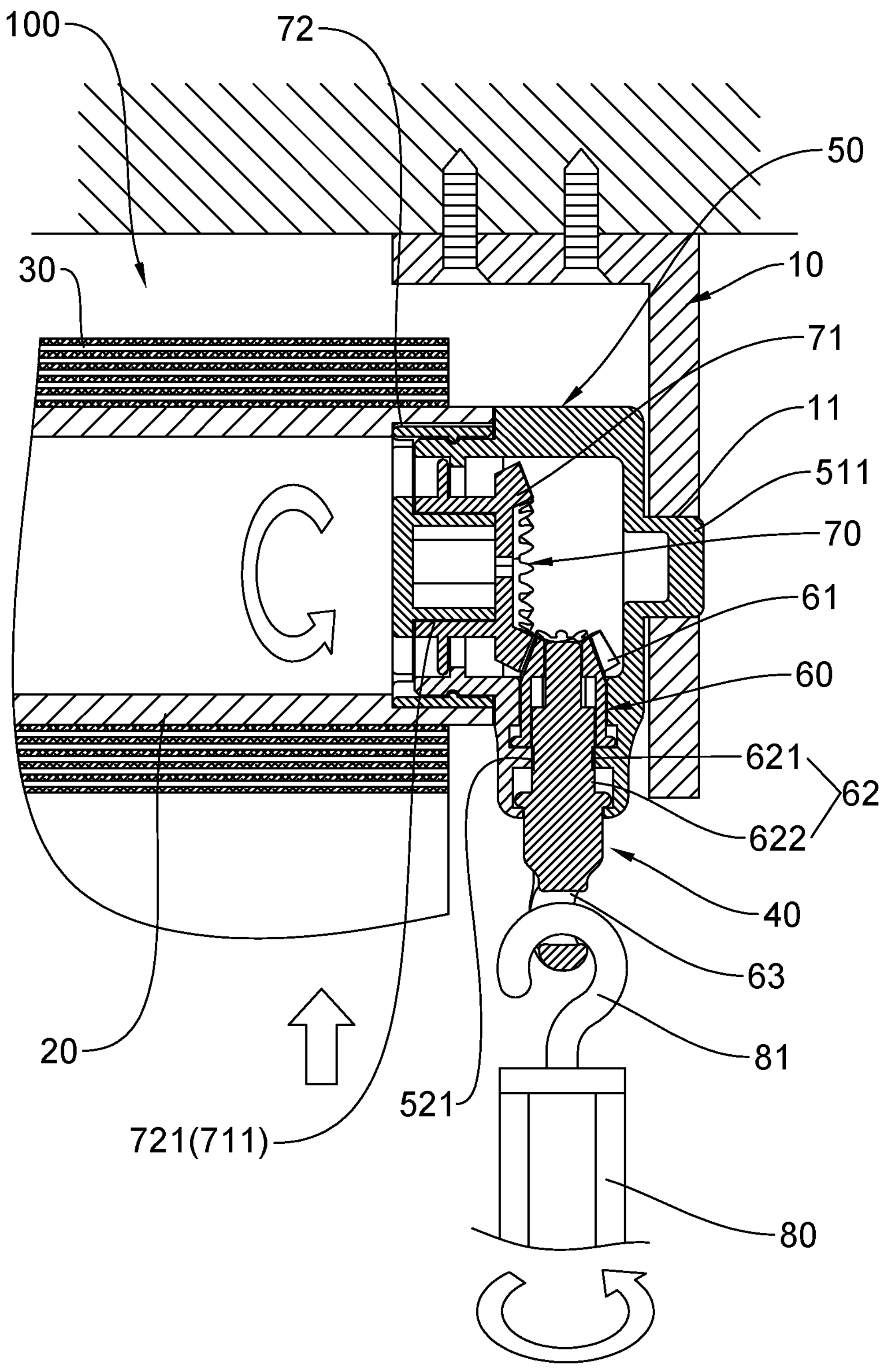
FIG. 5 is a cross sectional view to show that the driving rod is rotated counter clockwise to lift the curtain.
Figure 7:
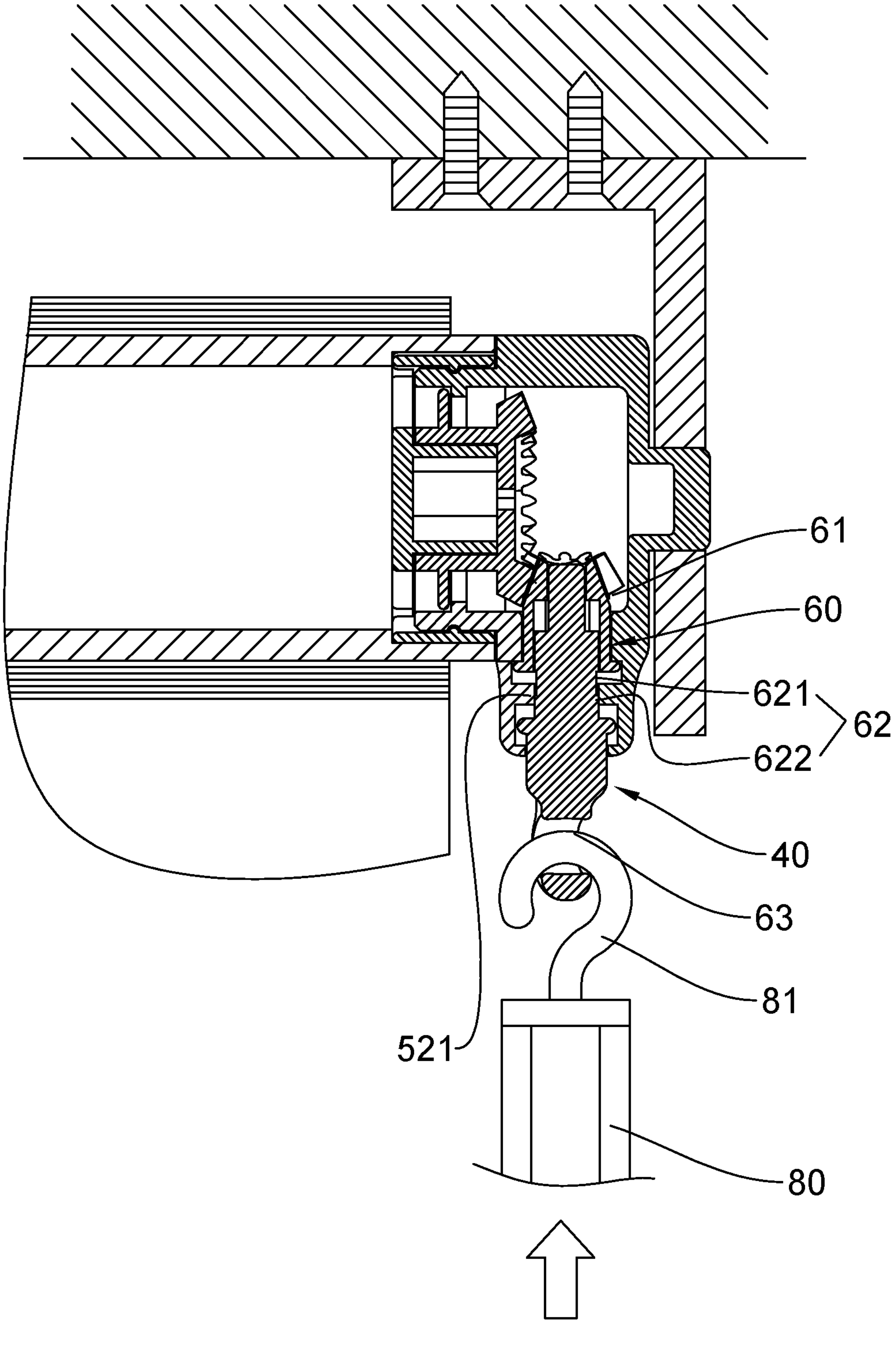
FIG. 7 is a cross sectional view to show that the driving rod is pushed upward to restrict the first transmission unit from rotating.

The first transmission unit 60 includes a first bevel gear 61, a first portion 62 and a second portion 63, wherein the first portion 62 is formed between the first bevel gear 61 and the second portion 63. The first bevel gear 61 and the first portion 62 are located in the first space 52, and the second portion 63 extends beyond the first space 52. The first bevel gear 61 is engaged with a second bevel gear 71 of the second transmission unit 70. A driving rod 80 is connected to the second portion 63, so that the second portion 63 being rotated by the driving rod 80, and the first transmission unit 60 rotates in the first space 52. As shown in FIGS. 3, 5 and 7, the first portion 62 includes a cylindrical section 621 and a polygonal section 622. A polygonal passage 521 is formed to the inner periphery of the first space 52. When the cylindrical section 621 is located relative to the polygonal passage 521, because the outer diameter of the cylindrical section 621 is slightly smaller than the diameter of the polygonal passage 521, the first transmission unit 60 is rotatable. When the polygonal section 622 is located relative to the polygonal passage 521 and engaged with the polygonal passage 521, the first transmission unit 60 is not rotatable. The second portion 63 includes a loop 631, and the driving rod 80 includes a hook 81 which hooks to the loop 631. Therefore, when rotating the driving rod 80, the second portion 63 together with the first transmission unit 60 are rotated.

The first transmission unit 60 includes a first bevel gear 61, a first portion 62 and a second portion 63, wherein the first portion 62 is formed between the first bevel gear 61 and the second portion 63. The first bevel gear 61 and the first portion 62 are located in the first space 52, and the second portion 63 extends beyond the first space 52. The first bevel gear 61 is engaged with a second bevel gear 71 of the second transmission unit 70. A driving rod 80 is connected to the second portion 63, so that the second portion 63 being rotated by the driving rod 80, and the first transmission unit 60 rotates in the first space 52. As shown in FIGS. 3, 5 and 7, the first portion 62 includes a cylindrical section 621 and a polygonal section 622. A polygonal passage 521 is formed to the inner periphery of the first space 52. When the cylindrical section 621 is located relative to the polygonal passage 521, because the outer diameter of the cylindrical section 621 is slightly smaller than the diameter of the polygonal passage 521, the first transmission unit 60 is rotatable. When the polygonal section 622 is located relative to the polygonal passage 521 and engaged with the polygonal passage 521, the first transmission unit 60 is not rotatable. The second portion 63 includes a loop 631, and the driving rod 80 includes a hook 81 which hooks to the loop 631. Therefore, when rotating the driving rod 80, the second portion 63 together with the first transmission unit 60 are rotated.

As shown in FIGS. 1 to 3, and 5 to 7, the second transmission unit 70 includes the second bevel gear 71 and a tubular part 72, wherein the second bevel gear 71 is axially connected to the tubular part 72. The second bevel gear 71 includes a reception hole 711 defined axially in the back thereof. The tubular part 72 includes a polygonal-shaped tube 721 which is engaged with the reception hole 711 to connect the second bevel gear 71 to the tubular part 72. The axis of the first gear 61 is perpendicular to the axis of the second bevel gear 71. The tubular part 72 is connected to the shaft 20. Specifically, the tubular part 72 includes multiple ridges 722 protruding from the outside thereof, and the ridges 722 are engaged with the shaft 20.

Figure 6:
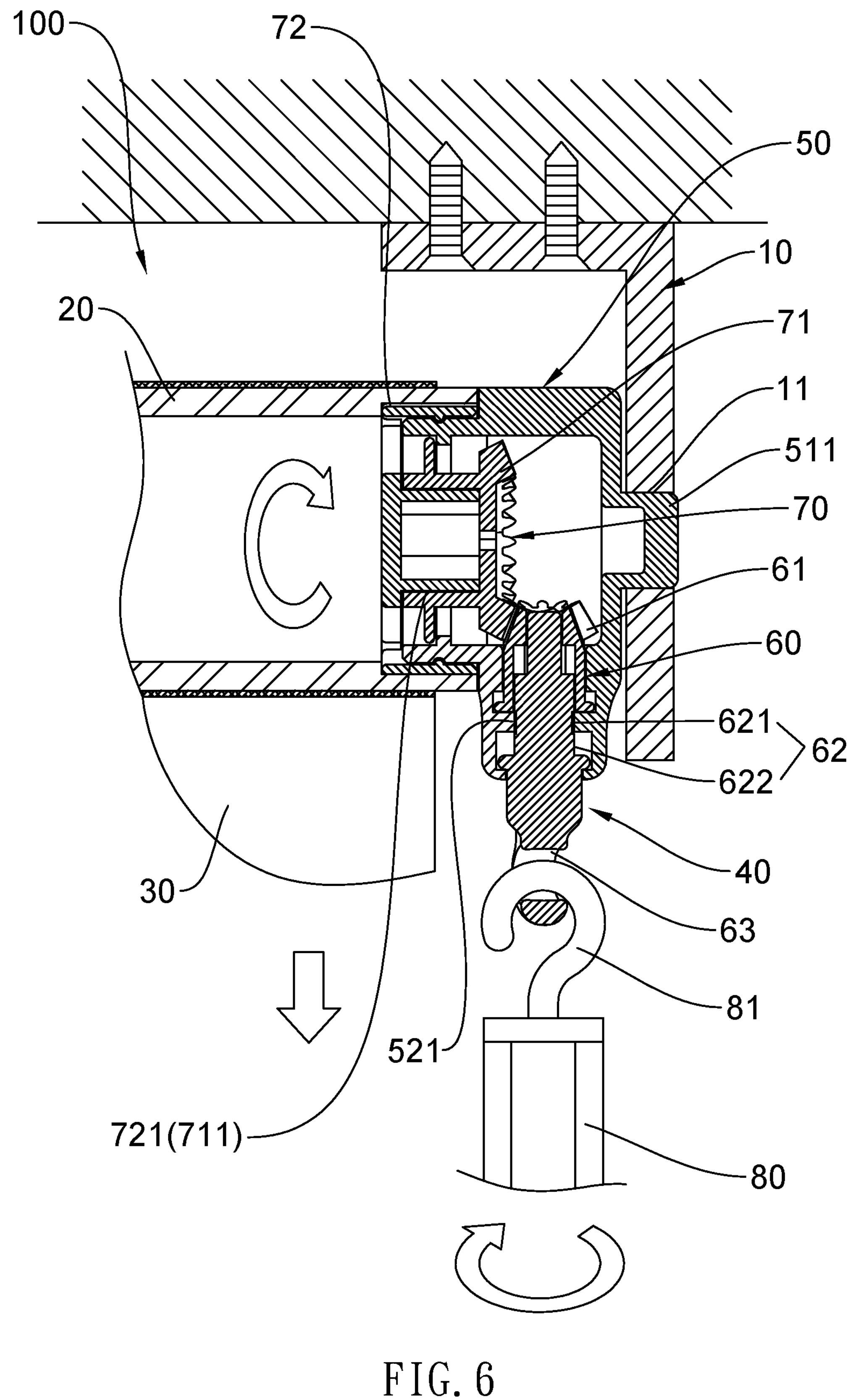
FIG. 6 is a cross sectional view to show that the driving rod is rotated clockwise to lower the curtain.

As shown in FIGS. 5 to 7, when in use, the driving rod 80 is connected to the second portion 63, and the user rotates the driving rod 80 to rotate the first bevel gear 61. The second bevel gear 71 is then rotated by the first bevel gear 61, and the tubular part 72 is co-rotated with the second bevel gear 71. The shaft 20 is rotated with the rotation of the second transmission unit 70 to lift or lower the curtain 30. As shown in FIG. 5, the driving rod 80 is rotated counter clockwise to lift the curtain 30. As shown in FIG. 6, the driving rod 80 is rotated clockwise to lower the curtain 30. As shown in FIG. 7, after adjusting the curtain 30, the driving rod 80 is pushed upward so that the first transmission unit 60 is moved upward, and the polygonal section 622 is engaged with the polygonal passage 521 to restrict the first transmission unit 60 from rotating. When the driving rod 80 is pulled downward, the polygonal section 622 is separated from the polygonal passage 521, the first transmission unit 60 is rotatable.

While we have shown and described the embodiment in accordance with the present invention, it should be clear to those skilled in the art that further embodiments may be made without departing from the scope of the present invention.

What is claimed is:

1. A scrolling system for a window curtain, comprising:

a scrolling device including a frame and a shaft, a curtain scrolled to the shaft;

a transmission device connected between the shaft and the frame so as to rotate the shaft and to scroll the curtain, the transmission device including a housing, a first transmission unit and a second transmission unit, the housing located between the frame and the shaft, the housing being a hollow housing and including a first space and a second space, the first space defined in a lower portion of the housing, the first transmission unit accommodated in the first space, the second space defined axially in the housing, the second transmission unit accommodated in the second space;

the first transmission unit including a first bevel gear, a first portion and a second portion, the first portion being formed between the first bevel gear and the second portion, the first bevel gear and the first portion movably located in the first space, the second portion extending beyond the first space, a driving rod connected to the second portion, the second portion being rotated by the driving rod so that the first transmission unit rotates in the first space, the first portion including a cylindrical section and a polygonal section, a polygonal passage formed to an inner periphery of the first space, wherein the cylindrical section is located relative to the polygonal passage when the driving rod is not pushed upward, the first transmission unit is rotatable, wherein the polygonal section is engaged with the polygonal passage when the driving rod is pushed upward, the first transmission unit is not rotatable, and the second transmission unit including a second bevel gear and a tubular part, the second bevel gear connected to the tubular part and engaged with the first bevel gear, wherein the second bevel gear is engaged with the first bevel gear regardless of movement of the driving rod, an axis of the first gear being perpendicular to an axis of the second bevel gear, the tubular part connected to the shaft, when the driving rod is rotated, the first bevel gear drives the second bevel gear which rotates the tubular part, such that the shaft is rotated to operate the curtain.

2. The scrolling system for a window curtain as claimed in claim 1, wherein the frame includes a recess, the housing includes a protrusion which is engaged with the recess.

3. The scrolling system for a window curtain as claimed in claim 1, wherein the housing is composed of two casings, the first and second transmission units are accommodated in the housing.

4. The scrolling system for a window curtain as claimed in claim 1, wherein the tubular part includes multiple ridges protruding from an outside thereof, the ridges are engaged with the shaft.

5. The scrolling system for a window curtain as claimed in claim 1, wherein the second portion includes a loop, the driving rod includes a hook which hooks to the loop.

6. The scrolling system for a window curtain as claimed in claim 1, wherein the second bevel gear includes a reception hole defined axially in a back thereof, the tubular part includes a polygonal-shaped tube which is engaged with the reception hole to connect the second bevel gear to the tubular part.

* * * * *